Feb. 14, 1967    R. T. VAUGHAN ETAL    3,303,931
ELECTRICAL TEST APPARATUS
Filed Feb. 14, 1963    3 Sheets-Sheet 1
FIG. 1.
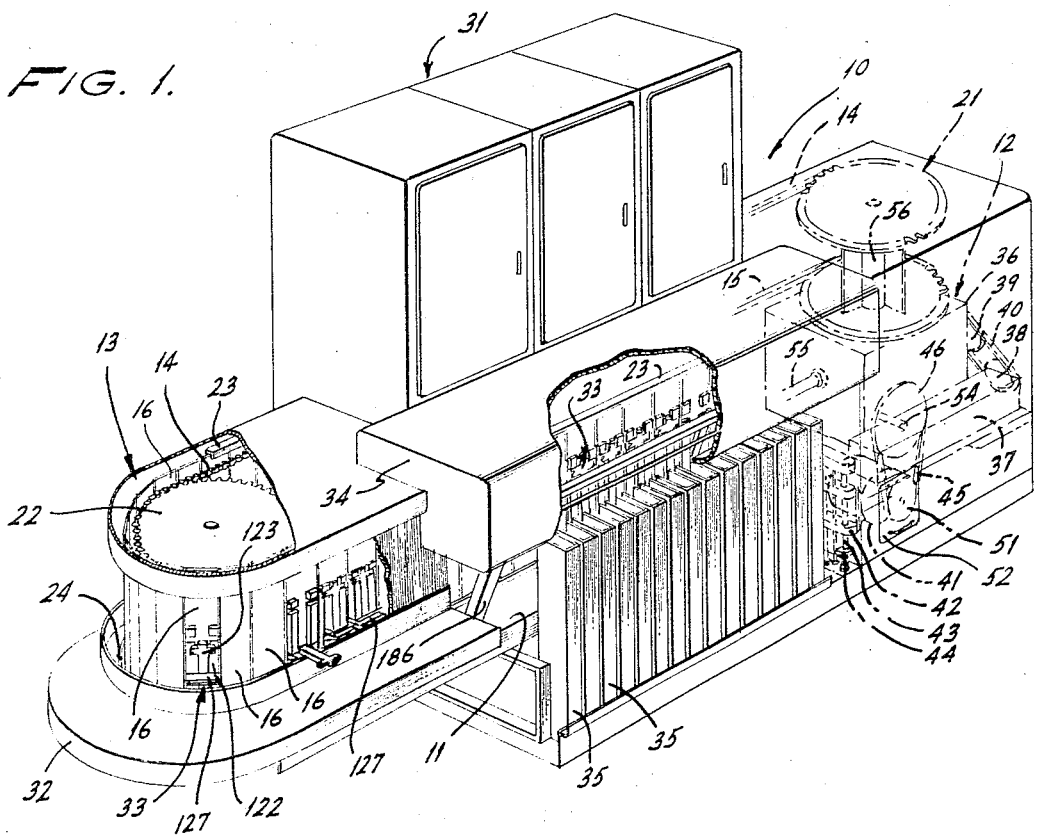
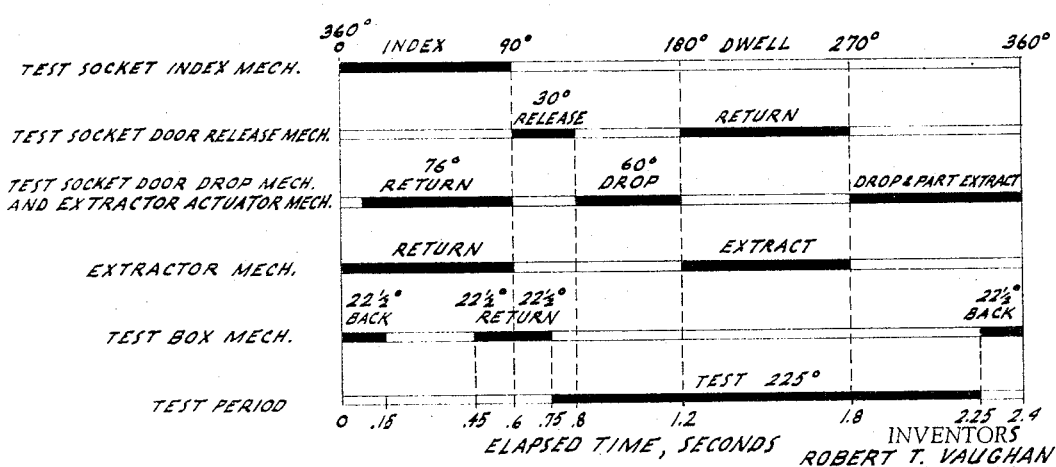
FIG. 8.
INVENTORS
ROBERT T. VAUGHAN
WILLARD H. MOLL
STUART L. PARSONS
WILLIAM H. SCOTT
BY
Harry W. Hargis III
AGENT

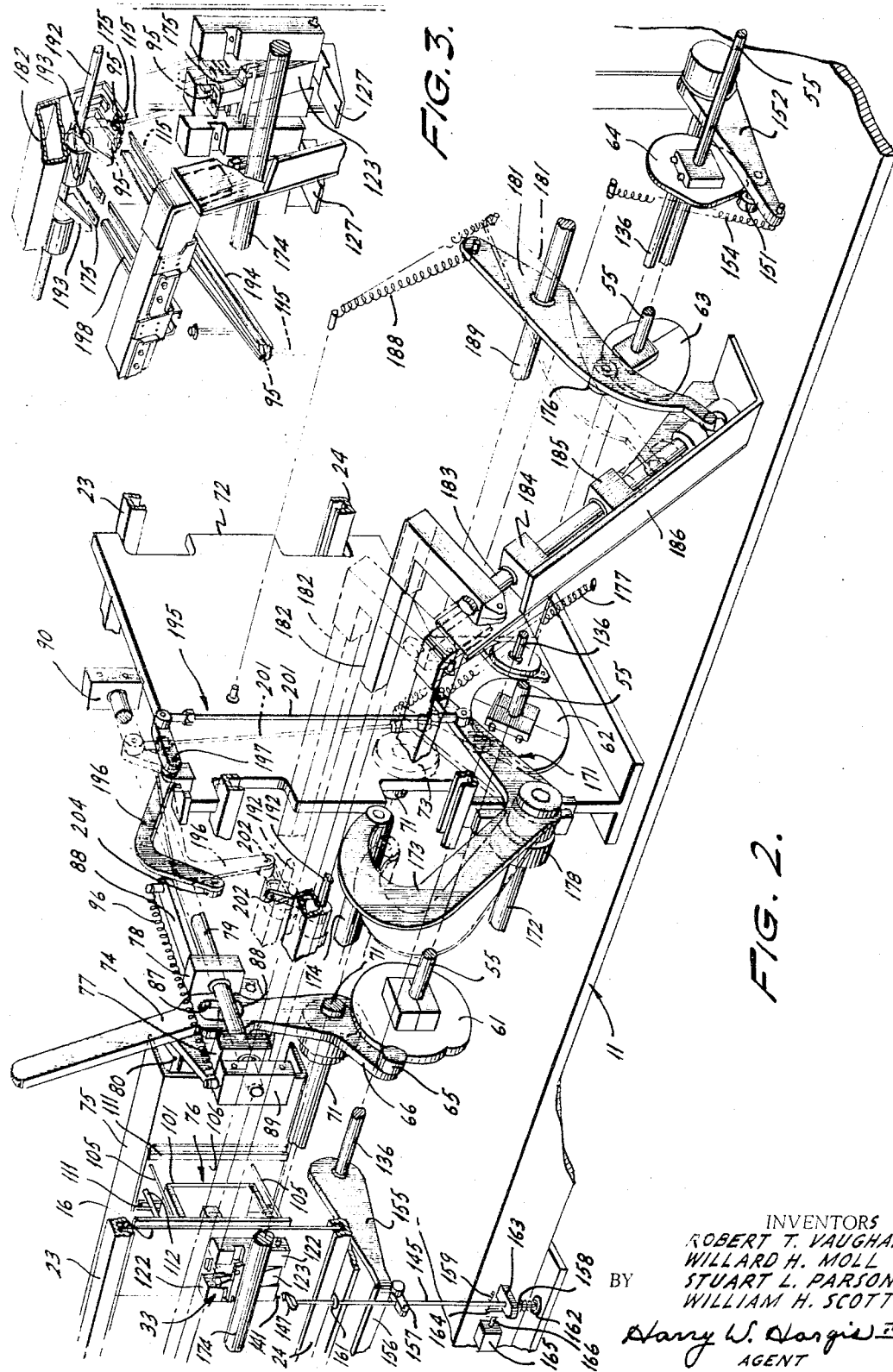

Feb. 14, 1967 R. T. VAUGHAN ETAL 3,303,931
ELECTRICAL TEST APPARATUS
Filed Feb. 14, 1963 3 Sheets-Sheet 3
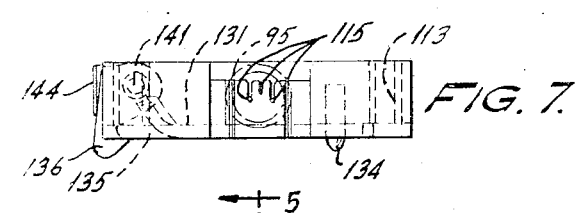
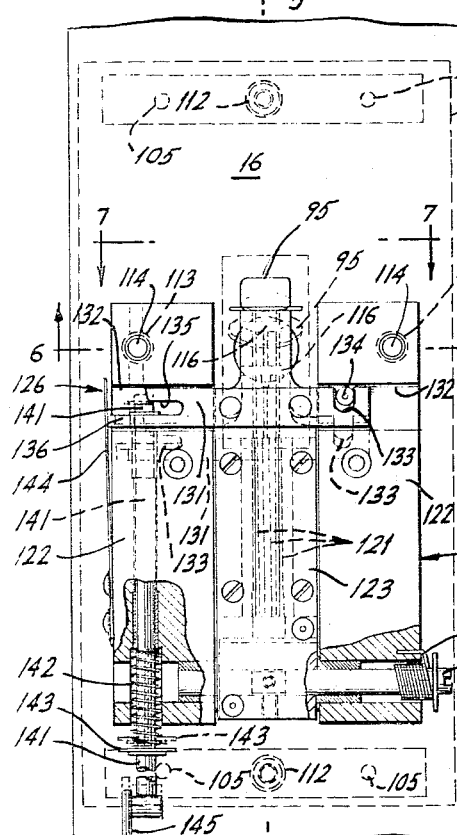
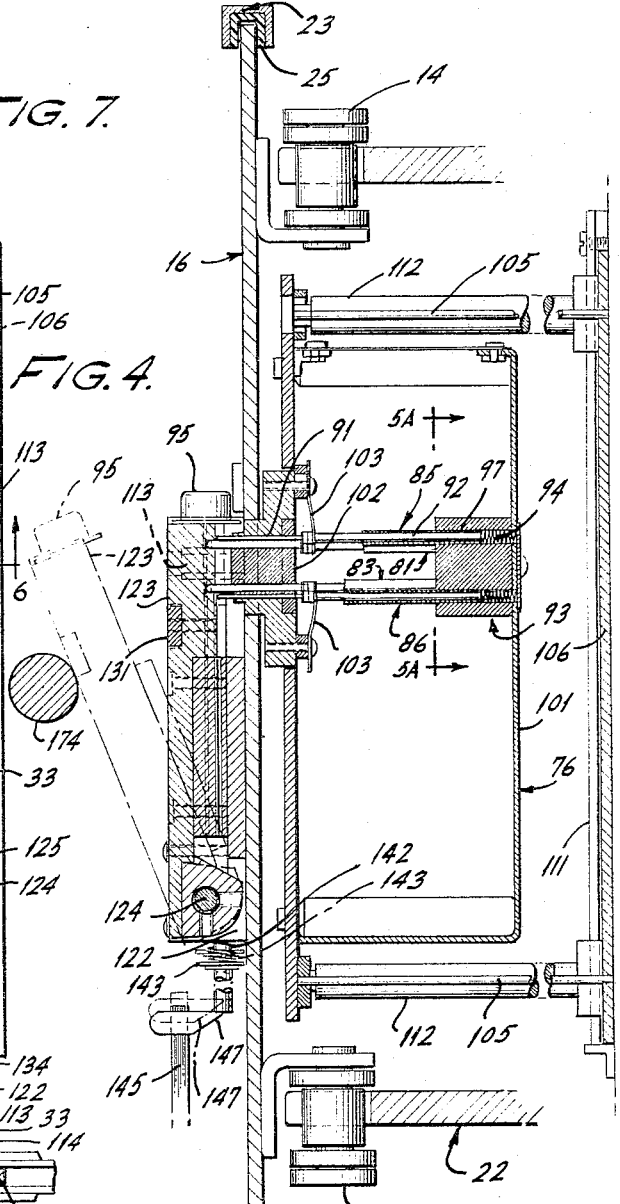
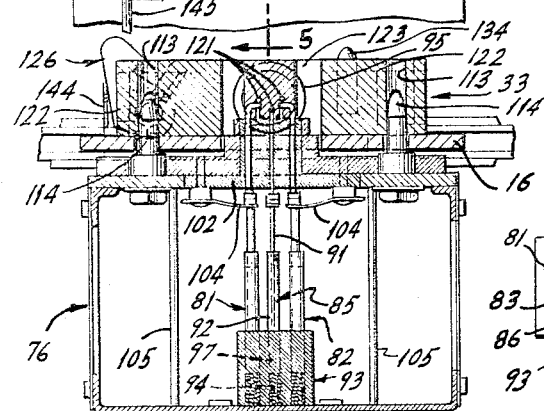
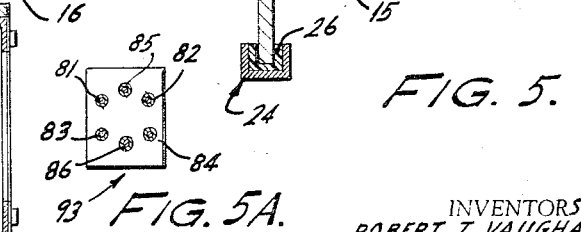
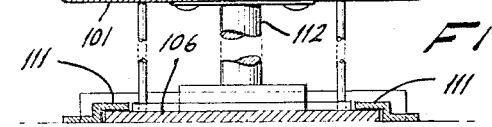
INVENTORS
ROBERT T. VAUGHAN
WILLARD H. MOLL
STUART L. PARSONS
WILLIAM H. SCOTT
BY
Harry W. Hargis III
AGENT

United States Patent Office 3,303,931
Patented Feb. 14, 1967

3,303,931
ELECTRICAL TEST APPARATUS
Robert T. Vaughan, Cheltenham, Willard H. Moll, Lansdale, Stuart L. Parsons, Gwynedd Valley, and William H. Scott, Sellersville, Pa., assignors to Philco Corporation, Philadelphia, Pa., a corporation of Delaware
Filed Feb. 14, 1963, Ser. No. 258,433
15 Claims. (Cl. 209—74)

This invention relates to electrical test apparatus and more particularly to mechanized test apparatus adapted both to convey and to test electrical components at relatively high speeds. While of broader applicability, the invention has especial utility in the handling of, and establishing of electrical test connections to, transistor devices of the type comprising protective hermetically sealed envelopes or housings from which extend a plurality of relatively long slender lead wires.

Problems in testing of transistor devices by applying high frequency signals to the same arise due to the general configuration of the transistors. By way of example, lead wires of some transistors requiring application of a high frequency signal thereto are in the order of several inches long and have protective coatings each comprising a relatively thin layer of gold. Relatively long, slender lead wires are difficult to insert in and extract from conventional socket means, and it has often been a practice to trim the lead wires close to the transistor housing to facilitate handling as well as accurately to determine the high frequency characteristics of the transistor. However, even insertion and removal of trimmed lead wires in making a series of tests entails some risk of damaging the protective gold layers to an extent rendering the transistor useless. For example, one series of high frequency tests may include beta, power gain, and capacitance measurements, whereas pulsed measurements tests may include delay, rise, storage, and fall times, each of which tests can be adversely affected by damage to the lead wires and their coatings.

It is therefore a broad objective of the invention to provide novel and improved test apparatus adapted to apply a series of sequential tests to a transistor device which overcomes difficulties normally encountered in utilizing conventional socket means.

It is also an object of the invention to provide high speed test apparatus in which measurements, such as those outlined above, may be made in a matter of seconds, conventional test circuits being modified to permit taking the measurement and recording the reading.

It is a still further object of the invention to provide socket means into which transistor lead wires may be inserted and confined in a position that minimizes lead capacitance, and which socket means disposes the lead wires in a manner permitting such application of the test probes to the wires that virtually no damage is done either to the wires or to protective coatings applied thereto.

To the foregoing general ends, the invention contemplates—in apparatus for the automatic testing of electrical components including a housing having lead wires extending therefrom—the combination comprising: frame means; means carried by said frame means and defining a path for the sequential transfer of component carrying socket members; a plurality of test probe devices each comprising reciprocably movable resiliently mounted probe means adapted for lateral engagement with the lead wires of carried components as they are transferred along said path, said probe means being disposed adjacent said path in such manner that reciprocation takes place in a direction transverse the path; a prime mover; drive means disposed in driven engagement with said prime mover and adapted to cause simultaneous movement of said probe means; travelling means for driving said test socket members along said path; and cam means disposed in driven engagement with said prime mover and adapted to cause intermittent motion of said travelling means, whereby to transfer said socket members along said path with a pause period at each of a plurality of station areas, said cam means further being constructed and arranged to energize said probe means in synchronism with the intermittent motion applied to said travelling means, said test probe devices being movable during the pause periods in the transfer of said socket members.

With more particularity, a preferred embodiment of the invention comprises a series of chain supported socket mounting plates that are driven by indexing means along a guide track supported by suitable frame means. In one region, through which the chain is driven, transistors are loaded into empty sockets, which sockets then are moved through a series of test stations provided with extractor mechanisms for removing the transistors from the sockets and depositing them in appropriate storage bins. Each test station comprises a movably mounted box that places high frequency test circuitry in close proximity to transistors undergoing test, contact with the lead wires being made by means of test probes comprising spring loaded contact pins that extend transversely of the path of movement of the chain driven sockets. After a transistor socket is indexed in position, the contact pins are pressed against the exposed leads and a measurement is taken as a signal is applied thereto. The test box is then retracted and each socket indexed to the next position. Upon each test, the extractor mechanism may or may not be signalled, in accordance with the test results, and provision is made for automatic extraction into a corresponding storage bin.

Each socket comprises an insulated, jig-like structure that includes a hinged support or "door" having laterally presented grooves adapted laterally to receive and confine the lead wires of a transistor. The lead wires are disposed and presented in a manner such that virtually no damage is done to the protective gold plating even though test probes are repeatedly extended into lateral contact with the wires. Also the test probes engage the lead wires at such positions, relative to the transistor devices, as to minimize the effects of lead wire capacitance.

The sequence of operations from the time a transistor is inserted into a test socket to the time it is automatically extracted from the socket includes: (1) indexing he test socket in the first test location, (2) movement of the test probes of the first test station into electrical contact with the lead wires of the transistor, (3) test, (4) withdrawal of the test probes from contact with the lead wires, and (5) indexing the test socket to the next test location. If the transistor fails a test it will be extracted after the test socket is indexed to the next test station. Extraction is provided for by opening the test socket door into which the transistor leads were inserted. As the door opens, the transistor moves into suitably positioned fingers which, when moved upward, remove the transistor from the socket door, cause the transistor to slide down suitably positioned guide means into a storage bin. The transistor socket door remains open until it is again loaded with a transistor in the loading region and is closed manually. All the extract mechanisms and test stations operate in the same manner, with the exception of the last station which has no storage bin, but includes guide means on which the transistors may accumulate for removal.

The foregoing as well as adidtional objectives and advantages of the invention will be more clearly understood from a consideration of the following description, taken in light of the accompanying drawing in which:

FIGURE 1 is a perspective showing of apparatus embodying the invention, and with some parts broken away and others shown somewhat diagrammatically;

FIGURE 2 is an enlarged exploded fragmentary showing, in perspective, of mechanical linkage means forming part of the invention embodied in apparatus shown in FIGURE 1, and further illustrating cam drive features of the invention;

FIGURE 3 is a somewhat more detailed showing of a portion of the linkage means shown in FIGURE 2, and illustrating further operational features of the invention;

FIGURE 4 is an enlarged elevational showing with parts broken away, of test apparatus illustrated in the foregoing figures, and with emphasis on the socket, or door, and its associated test probes;

FIGURE 5 is a side elevational view, in section, of apparatus seen in FIGURE 4 and looking in the direction of arrows 5—5 applied to FIGURE 4;

FIGURE 5A is a view, partly in section, taken along the line indicated by arrows 5A–5A applied to FIGURE 5;

FIGURE 6 is a sectional view of apparatus illustrated in FIGURE 4 looking upward in the direction of arrows 6—6;

FIGURE 7 is a sectional view of a portion of the apparatus illustrated in FIGURE 4 and looking downward in the direction of arrows 7—7 applied thereto; and FIGURE 8 is a timing chart illustrating the operational cycles of the several mechanisms shown in the preceding figures, and of their relationship to one another.

In the illustrated preferred embodiment of the invention, and first with reference to FIGURES 1 and 2, the unitary conveyor and test apparatus 10 comprises base structure 11 containing, in a right hand region thereof, the drive and index mechanism 12 for the conveyor means 13. Conveyor means 13 comprises upper and lower chains 14 and 15, respectively (see FIGURE 5), and vertically extending plate members 16 carried thereby. Chains 14 and 15 are parallel to one another, and both are driven by means 21 comprising a pair of sprockets axially spaced from one another substantially the height of plate members 16. The chains are driven over like sprocket means 22 comprising a pair of idler sprockets disposed toward the other end of base structure 11. Plate members 16 are retained in the regions between chains 14 and 15 by parallel guide track means 23 and 24 including suitable bearing means 25 and 26 for plate members 16 (see FIGURE 5).

Cabinets 31, containing circuits for testing the components as they move with the conveyor means, are supported by base structure 11 above conveyor means 13. Inasmuch as a detailed description of the electrical test circuits is not necessary for a complete understanding of this invention, no such description will be undertaken. Accordingly, the foregoing as well as the ensuing descriptive matter is directed to such mechanical constructional features as characterize the invention.

Continuing with the description, a loading platform 32 extends along a curved portion of conveyor means 13 and is adapted to support components prior to their insertion into the socket means 33 for testing, which socket means are supported by plate members 16 for movement through the test station area. The test area extends along the frontally presented straight portion of conveyor means 13 and is partially enclosed by hood structure 34, parts of which have been broken away to show test socket means 33 in the test station area. Storage bin means 35 are provided below the test stations to accommodate storage of components as they are tested and extracted from the sockets, in accordance with the results of a test.

Six basic mechanisms of the test apparatus are supported by the above described base structure and comprise the following:

A. Test socket indexing mechanism;
B. Test socket door release mechanism;
C. Test socket door drop mechanism;
D. Extractor actuator mechanism;
E. Extractor mechanism; and
F. Test box mechanism.

Considering the above mechanisms now in detail, and each separately but not necessarily in the order shown, the *Test Socket Indexing Mechanism* comprises drive sprocket means 21 adapted for indexing movements through equal angular increments by a combination speed reduction and indexing mechanism 36. Reduction mechanism 36 is driven by a motor or prime mover 41 disposed upon a movable base 42 which is adjustable by a screw 43 adapted for rotation by a hand wheel 44. Speed reducer 36 is drivingly coupled with motor 41 by a belt 45 encircling pulleys 46 and 51. Motor pulley 51 may be of the adjustable split type, and the construction and arrangement of the motor-pulley mechanism is then such that when motor 41 is moved by screw 43, by turning wheel 44 in one direction, drive belt 45 is moved relatively toward the center of the split pulley 51 thereby reducing the effective diameter of the latter, hence reducing the speed of the machine. Conversely, turning screw 43 in the opposite direction increases the effective pulley diameter, hence increasing the speed of the machine. Speed changes preferably are made while the machine is running in order to minimize the effects of wear-producing friction between split pulley 51 and belt 45, as well as to provide a smoother transition from one speed to the other. Access to the above described drive motor adjustment is provided by a door 52 hingedly mounted in the front wall of machine compartment housing 53.

Speed reduction and indexing mechanism 36 drivingly connected to motor 41 may be and preferably is a conventional unit, such for example as a unit of a type manufactured by Standard Tool and Manufacturing Co. and having a 40 to 1 gear reduction between input shaft 54 and a continuously rotating cam shaft 55. A second shaft 56 is driven intermittently by indexing means (not shown) within mechanism 36, second shaft 56 extending vertically and being drivingly coupled with the conveyor chain drive sprocket means 21, as hereinabove described. Indexing is accomplished with known 90° barrel cam means (not shown) forming part of mechanism 36 such that through 90° rotation of the barrel cam indexing of shaft 56 takes place, and the remaining 270° of dwell on the barrel cam are used to accommodate carrying out the other machine functions, as provided for by cam shaft 55, required in testing the units, which machine functions hereinafter will be more fully described.

Timer means 37 is provided to coordinate energization of the test circuits housed within cabinets 31 with the positions of the various mechanisms in performing their functions. In order to drive timer means 37, a sprocket 38 is mounted on its drive shaft (not shown) and is driven by a chain encircling sprocket 38 and a sprocket 39 rotatable with an extension of cam shaft 55.

With particular reference to FIGURES 2 and 3, the former being an exploded view in which elements have been moved to the left and to the right of pedestal 72, for the sake of clarity, it will be appreciated that the heart of the mechanism comprises cam shaft 55 which carries four cams 61, 62, 63 and 64 spaced axially one from the other along the shaft. Each of the cams governs functions of a different mechanism, and at such times relative to one another and to indexing of conveyor means 13 as are shown in the timing chart (FIGURE 8) forming part of the drawings and which will be hereinafter more fully explained in describing operation of the machine.

The mechanism-control cams driven continuously by cam shaft 55 comprise, reading from left to right along the cam shaft:

(1) Test box mechanism cam 61;
(2) Door drop and extractor actuator mechanism cam 62;
(3) Extractor mechanism cam 63; and (4) Door release mechanism cam 64.

While it is to be understood that only right hand portions of linkages operated by the cams are shown, certain of the linkages include elements that extend the full length of the test area and are mounted to like pivotal and slidable machine elements disposed at the other ends of the linkages. Where duplication of a machine element occurs, note will be made of the fact in the description.

Turning now to the *Test Box Mechanism*, the test box mechanism cam 61 is engaged by a cam follower 65 which is carried by a bell crank 66 disposed for pivotal movements in a substantially vertical plane. Bell crank 66 is mounted upon a horizontally extending torque shaft 71 journalled for rotation, as seen at 73, upon left and right hand vertically extending pedestals, of base means 11 of the machine, the right hand one of which pedestals is the only one shown and is designated by the number 72. An upwardly extending portion of bell crank 66 comprises a rocker arm 74, and a like rocker arm (not shown) is mounted for rotation with the torque shaft at its other end. Each rocker arm 74 includes a slot 87 slidably linked with a pin 88 affixed to the flanged end portion 80 of a channel member 75 which carries test box means 76. Channel member 75 is supported for movements toward and away from test socket means 33 by pairs of blocks as seen at 77 and 78 including bearings slidably mounted on a pedestal-supported rod 79 extending transversely of channel 75, which blocks 77, 78 are mounted to a flanged end portion 80 of the channel. Rod 79 is mounted upon pedestal 72 by block-like supports 89 and 90. The upper free end of each bell crank or rocker arm portion 74 comprises a handle by which test box mounting channel 75 can be moved manually forward or backward should the need arise, such as for example when servicing the machine, and cam 61 is adapted to move test boxes 76 (see also FIGURES 4 and 5) simultaneously forward as each of sockets 33 is indexed to a test station. A spring 96 extends between a rearwardly extending arm 88 of flange 80 and the front support 89 of rod 79 whereby to urge the channel member 75 away from the test socket means 33 and toward a retracted position.

With reference also to FIGURES 4, 5, 6 and 7, each test box means 76, also identified elsewhere in the disclosure as a test probe device, comprises a plurality of probes, preferably a set of six probes 81, 82, 83, 84, 85 and 86 (see also FIGURE 5A). Each of the probes is substantially identical to the others in construction and, with reference to probe 85 for exemplary purposes, each comprises a flexible and resilient electrically conductive wire 91 supported by a cylindrical rod 92 of electrically insulating material that telescopes within a hollow cylindrical portion 97 of base 93. A coil spring 94 is disposed within the hollow base 93 that receives the insulative push rod 92 and serves as a shock absorber for the conductive test probe portion 91, as it is moved into electrical contact with a lead wire of a transistor 95 to be tested, as will be hereinafter more fully described (see particularly FIGURE 5). Each test box means 76 further comprises a rectangular housing 101 provided with an insulative face portion 102 through which the test probes 91 extend. Terminals 103 and 104 are insulatively mounted upon front wall portion 102 of the test box and each extends into resilient, electrically conducting engagement with a test probe 91, said terminals being connected with test apparatus disposed within cabinet structure 31, through suitable wiring not shown.

Test box means 76 are mounted side-by-side along the channel member 75 extending substantially the length of the test area, and are movable frontally toward and away from the socket supporting plates 16 through the action of cam 61 upon bell crank 66, 74 as described.

Each housing 101 for the test box means is mounted upon four spring steel wires 105 extending from a plate 106 removably mounted on slides 111 provided on channel member 75. Wires 105 have forward ends presented toward the conveyor mounted socket supporting plate 16 and are affixed to the test box housing at their other ends. Stop members 112 are supported at the top and bottom of each plate 106, and are presented for releasable engagement with a test box housing 101 to prevent excessive movements of the latter on its supporting wires 105. Each of the socket supporting plates 16 has apertures 113 (FIGURES 4, 5 and 6) that are axially aligned with locating pins 114 provided on each test box housing 101, so that as a test box means 76 is moved forward, by pivoting of the bell crank 66, 74 (FIGURE 2) slidably linked to mounting channel 75, pins 114 register with apertures 113 in an indexed socket and plate assembly 16, 33. Wires 105 provide resilient mounting of the test box housings 101, and permit limited lateral movements thereof arising, for example, from very small misalignments of locating pins 114 with respect to apertures 113. Also, and as best seen in FIGURE 5 as test box means 76 is moved toward a test socket 33 the probes 91 are thrust into abutting, electrical engagement with laterally presented lead wire portions 115 (FIGURE 7) of an inserted transistor 95. Abutting engagement is accommodated by a pair of horizontal slots 116 (FIGURE 4), which slots extend transversely of vertically extending, laterally presented grooves 121 (FIGURE 4) provided in a test socket and expose the transistor lead wire portions 115 for engagement by suitably bent tips of probes 91 (FIGURE 6).

Each test socket 33 includes a base portion mounted upon a corresponding one of the plates 16, and comprising a pair of vertically extending, parallel block members 122 between which is hingedly mounted the socket "door" 123. Hinged mounting of the socket door provides for a closed position (full line showing, FIGURES 4 and 5), a partially open position (broken line showing, FIGURES 4 and 5), and a full-open position for loading in which the door rests on a suitably provided stop 127 (FIGURES 2 and 3). In the full-open position of the door lead wires 115 of a component 95 are receivable within the laterally presented grooves 121 of the socket door 123. Hinged mounting of the door is provided by a pin 124 extending through a lower region of the parallel block members or base portions 122 and rigidly affixed to the door 123 for pivotal movements therewith. A torsion spring 125 is provided at the end of pin 124 and is adapted to urge the door toward its open position against the holding force exerted through interengagement of a latch member 136 with a bifurcation 135 formed at the end of a latch bar 131 carried by the door (FIGURE 4). Latch member 136 is carried by the upper end of a combined slidable and rotatable rod-like member 141 held in the axial position shown by a compression spring 142 reacting between the member 141 and base portion 122. Rotation of member 141 and the attached latch member 136—as will occur when the door is moved to closed position by virtue of interengagement of lower bifurcation 135 with latch member 136—is controlled by leaf spring 144 carried by base portion 122 and urged against latch member 136. Latch bar 131 further includes a slot 133 disposed for registry with a pin 134 carried by base portion 122, whereby alignment of the door with the socket base portion is insured. Door 123 is released for opening by sliding the pin or rod-like member 141 upwardly against the force of its retaining spring 142, whereupon latch member 136 is elevated above the lower one of bifurcations 135 and the door is forced open by spring 125.

As illustrated in FIGURES 2, 4 and 5, means for vertically moving pin 141, to provide for release of door 123 by latch member 136, comprises a push rod 145 operable by linkage means including a torque shaft 136 and a cam follower 151 actuatable by the door release mechanism cam 64.

More specifically, and with particular reference to FIGURE 2, the *Test Socket Door Release Mechanism* comprises cam follower 151 carried by a lever 152 rigidly affixed to the horizontally extending pivotal torque shaft 136. Follower 151 per se comprises a roller extending transversely of lever 152 and generally along an axis parallel to torque shaft 136. Cam follower 151 is resiliently urged against cam 64 by a coil spring 154 reacting between base pedestal 72 of the machine and the free end of lever 152. A pair of door release rocker arms, one of which is designated by numeral 155 (left portion of FIGURE 2), are rigidly affixed to torque shaft 136 and spaced from one another along the axis of the shaft. Each of rocker arms 155 is presented forwardly as respects base 11 of the machine and both support a door release bar 156 extending in generally parallel relation to torque shaft 136.

A push rod 145 is provided for each of the test stations, with the exception of the first station which has none inasmuch as extraction of a transistor is carried out at the station following the test station which detects that the transistor is to be extracted. Each push rod 145 is vertically slidable within upper and lower bearing means 161 and 162, respectively, mounted upon the pedestal 72 and upon a flange 17 on base 11 of the machine. The upper end of rod 145 comprises an abutment portion 147 that is positioned for frontal releasable engagement with latch pin 141. A push rod actuator 157 is disposed intermediate push rod bearings 161, 162 and is releasably engageable by door release bar 156, the latter being movable by pivoting of door release rocker arm 155. Push bar 156 in extending the full length of the test area is engageable with each of the push rod actuators 157 as it is moved downwardly. A push rod actuating spring 158 is compressed between the push rod bearing 162 and a flange 163 affixed to the push rod in a region of the latter below the push rod actuator 157. Push rod 145 is locked, in position tending to compress actuating spring 158, by a pawl 164 that engages flange 163 to maintain the lower position of the push rod against the compression of spring 158. A plunger 166 operated by a solenoid coil 165 is linked to pawl 164, and when coil 165 is energized plunger 166 moves pawl 164 to a position in which it disengages flange 163, a spring reacting between base 11 and the pawl to urge it into its locking position. The compressed spring 158 then moves push rod 145 upwardly and portion 147 thereof abuttingly engages door release pin 141 for movement of the door to open position. (See broken line showings, FIGURES 4 and 5.) In order to reduce the power required of solenoid coil 165, door release bar 156, just prior to energization of the solenoid coil, unlocks push rod 145 by moving it downwardly to move flange 163 away from pawl 164. Following downward movement of rod 145, solenoid coil 165 is energized and pawl 164 moved out of the path of flange 163, after which door release bar 156 moves upwardly, releases the push rod actuator 157, and permits spring 158 to move push rod 145 up to engage pin 141 and accommodate opening of socket door 123 (see broken line showings; FIGURES 4 and 5). Operation of the door release mechanism is of course only carried out in the event that the test circuits indicates that a transistor is to be extracted, and the door is released at the station immediately following and adjacent the station at which the test was made.

Again it will be noted that door release cam 64 is one of the four cams disposed in spaced relation along the length of continuously rotating cam shaft 55 driven by gear reduction and indexing mechanism 12. Cam shaft 55 rotates continuously throughout the indexing operation and each of the cams is so synchronized with the indexing operation, through known timing means, as to provide a suitable function of its associated linkage as a socket is indexed to a test station.

Still with reference to FIGURES 2 and 3 the *Test Socket Door Drop Mechanism* comprises another of the four cams on cam shaft 55 and designated as the door drop mechanism cam 62. This operates a bellcrank cam follower 171 mounted for pivotal movements on the torque shaft 172 (see broken line showing, FIGURE 2) supported at its ends in suitable bearing means, one of which is seen at 178 supported by pedestal 72. Another bell crank 171 (not shown) is carried at the other end of torque shaft 172 and the free end portions of the bell cranks support a door drop roller 174 that is rotatably supported by suitable bearing means (not shown) at each of its ends and serves to engage a released door 123, as shown in FIGURES 2 and 3 (roller 174 is omitted from FIGURES 4 and 5) and to hold it in a position accommodating extraction of an ejected transistor 95 by mechanism hereinafter to be described. A spring 177 interconnects base 11 and follower 171 and maintains engagement of the latter with cam 62.

Roller 174 of the socket door drop mechanism controls locations of a door 123 after it is unlatched, inasmuch as when the door release mechanism unlatches the door it pivots away from the socket about ⅛ of an inch until it stops against door drop roller 174 extending along the machine just behind the sockets in the test area. The door drop roller then is moved to drop the socket door 123 to a point where its upper end is adjacent the extractor fingers 175 of the extractor mechanism where it pauses long enough for fingers of the latter mechanism to withdraw the transistor 95 upwardly from socket door 123 (see broken line vs. full line showing, FIGURE 3). The door drop roller 174 then lowers socket door 123 onto the door rest 127 which is part of the conveyor chain plate 16. For the sake of clarity, rest 127 has not been shown in FIGURES 2 and 4 to 7, but it will be understood that a fully opened door will remain in this position throughout the remainder of its travel, and until such time as the socket is again loaded in the loading area and the door again closed.

Cam 63 operates the aforementioned *Extractor Mechanism* by moving a follower 176 mounted upon a rocker arm 181 pivotally mounted upon a shaft 189 affixed to pedestal 72. In turn, rocker arm 181 is pivotal to drive extractor fingers 175 mounted on square tubing 182, which fingers engage the transistor carried by socket door 123. Square tubing 182 is supported at each of its ends by a downwardly inclined rod 183 that is slidable within bushings 184 and 185 affixed to similarly inclined bracket means 186 mounted upon base 11, which slidable movement is indicated by the broken line showing in FIGURE 2. Rocker arm 181 includes a pin 191 that engages a yoke carried by slidable rod 183, and a spring 188 interconnects base pedestal 72 with the rocker arm resiliently to urge follower 176 against cam 63. The construction and arrangement of the extractor mechanism is such that pivoting of rocker arm 181 by cam 63 moves the rod and the square tubing affixed thereto slidably along bracket 186. When square tubing 182 is raised to the broken line position of FIGURE 2 (full line in FIGURE 3), a transistor 95 which has moved into fingers 175 is withdrawn from the socket, as seen in FIGURE 3. When fingers 175 reach the upper limit of travel, a shaft 192 mounted upon tubing 182, and on which a transistor ejector or "kicker" 193 is mounted, is rotated and strikes transistor 95 to cause it to slide from the extractor fingers 175 onto the unloading chute 194 and into a bin, 35 as seen in FIGURES 1 and 3.

Rotation of "kicker" shaft 192 is achieved by a linkage 195 (FIGURES 2 and 3) operated by the door drop mechanism lever 171, which linkage generally is known as the *Extractor Actuator Mechanism*. Linkage 195 comprises a rocker arm 196 pivotally mounted at 197 upon pedestal 72 above the level of upper conveyor chain 14 and linked by a rod 201 to the door drop mechanism lever 171. The kicker shaft includes at its end a kicker lever 202 presented for striking by a roller 204 carried by rocker arm 196, whereby to rotate shaft 192. This movement is shown in broken lines also in FIGURE 2. The construction and arrangement is such that after door drop lever 171 has moved roller 174 to hold the door partially open, as seen in FIGURES 2 and 3, to permit the transistor to be extracted, door drop cam 62 is moved additionally to cause the linkage 195 to operate kicker lever 202 to rotate shaft 192 and kicker 193 (FIGURE 2). Kicker 193 will push the transistor onto the unload chute 194, (FIGURE 3) if for some reason it will not slide as normally is the case. Kicker 193 is affixed to shaft 192 by torsion spring means within a housing 203 so that if for any reason transistor 95 is locked in extract fingers 175 and cannot slide, kicker 193 will not operate. This protects the mechanism as well as the transistor from damage.

Chutes 194 upon which the transistor slides are adjusted so that they are slightly below the extract fingers 175 when the fingers are in their upper position. This insures smooth transfer of a transistor from the extract fingers to a chute.

Turning now with particularity to a *Typical Operating Sequence* of the machine, FIGURE 8 illustrates in chart form the relative functions of each of the described mechanisms. Reading from left to right on the chart, the first 90° of angular movement of the indexing barrel-cam of combined speed reducer and indexing means 12 moves each test socket the distance of one station. The remaining 270° of dwell, along with the 90° indexing period, are taken up for various other functions of the mechanisms as listed from top to bottom in the left hand column. For example, *Test Socket Door Release Mechanism* cam 64 during the 90° to 120° dwell of the barrel cam is so shaped as to provide for the release of the door by rotating arm 152 downwardly, which in turn rotates shaft 136 and arm 155. Arm 155 in moving downwardly moves door release bar 156 against abutment member 157 to move rod 145 downwardly. In moving downwardly flange 163 compresses spring 158 against bearing 162, and flange 163 is moved out of engagement with pawl 164. If the test at the previous station has called for extracting of the transistor upon movement thereof to this station, trol circuits, to move plunger 166 to the left, whereby pawl 164 is pivoted to the left to release flange 163. Cam 64 then, in the same 90° to 120° rotation of the solenoid coil 165 will be energized, by any suitable conbarrel cam, moves to permit arm 155 under the force of return spring 154 to move up and permit compression spring 158 to move rod 145 upwardly. In moving upwardly, rod 145 moves abutment member 147 into engagement with door latch actuating rod 141, as best seen in broken lines in FIGURES 4 and 5, and door 123 moves to its open position. Between 180° and 270° of barrel cam rotation, the Test Socket Door Release Mechanism will have been returned to its rest position where it remains throughout the next 180° of barrel cam rotation, which carries into the next cycle.

While the test socket is being indexed during the first 90° rotation of the barrel cam, the *Test Socket Door Drop Mechanism* and the Extractor Actuator Mechanism are returned to their rest positions, and the door 123 which has been released engages the door drop roller 174. As shown in broken lines in FIGURE 2, roller 174 is moved down after 120° rotation of the indexing barrel cam through the rotation of arm 173 downwardly by the action of cam 62 against follower 171. With reference to FIGURE 3, movement of the door 123 to the full line position moves the flanged body portion of transistor 95 into extract fingers 175 in their broken line position. After 270° rotation of the indexing cam the Extractor Actuator Mechanism is operated by door drop cam 62, which involves additional movement of arm 173 to drop roller 174 to a position permitting door 173 to fall to a rest position engaging stop 127. This same movement of arm 173 operates rod 201 to pivot arm 196 into engagement with kicker lever 202, whereby to move the latter to the broken line showing of FIGURE 2 and kick a transistor either into chute 194, from which it is collected, or into a chute 198 from which it drops into a storage bin 35. Also in the first 90° of rotation of the indexing barrel cam, the Extractor Mechanism will have returned to its rest position, and between 180° to 270° of rotation of the indexing barrel cam, the transistor 95 has been moved upwardly from open test socket door 123, whereupon it is kicked into the chute 194 as described above. Upward movement of extractor fingers 175 is achieved in this period of the cycle by rotation of cam 63 to rotate arm 181 to the broken line showing of FIGURE 2, whereby rod 183 is caused to slide upwardly, moving square tubing 182 and fingers 175 upwardly in carrying out the extraction function.

In the course of these operations the Test Box Mechanism cam 61 will have rotated to move test boxes 76 forward and backward whereby the test probes are disposed in test engagement with lead wires 115 (FIGURE 5) between the 112.5° and the 337.5° rotation of the indexing barrel cam.

The complete cycle of indexing mechanism operation, as well as testing of the component in the high speed adjustment of the prime mover, takes place, in a representative machine, in an elapsed time of 2.4 seconds. In the embodiment illustrated the motor pulley is adjustable to provide a test period as long as 7.2 seconds. By virtue of this timing, components can be tested at rates varying between 500 and 1500 units per hour, merely by adjusting the speed at which the motor drives the combination gear reducer and indexing mechanism.

It will be appreciated that the invention provides a variable speed, automatic transistor testing apparatus characterized by a single unit comprising a novel combination of mechanical linkages that achieve, under the actuation of a single prime mover, sequential step-by-step movements of test socket means, test probe means, and extractor means for automatically carrying out the testing and rejection, or sorting, of transistor devices. By virtue of the probes being movable into abutting contact with lateral portions of the transistor lead wires, reliable high frequency measurements are achieved and a minimum of damage is done to the conductive lead wire coating, as compared with plug-in type socket members.

We claim:

1. In apparatus for the automatic testing of electrical component means at predetermined test station areas, each said means comprising a housing having lead wires extending unindirectionally therefrom, the combination of: a plurality of individual supporting means for each said component means; means defining a path along which said supporting means may be sequentially transferred between said test station areas; a plurality of test probe devices each disposed at a test station area and comprising a resiliently mounted set of test probes disposed to one side of the lead wires of component means carried by said supporting means; means mounting said test probe devices for reciprocable movement to move said test probes into and out of engagement with lateral portions of the lead wires of said component means, as they are sequentially transferred by said supporting means along said path, the recited reciprocable movement being effected transversely of both said path and the direction of extension of said lead wires; prime moving means operable to effect the recited reciprocable movement of said test probes and to transfer said supporting means along said path; and indexing means disposed in driven engagement with said prime moving means and operable to effect intermittent transfer of said supporting means to provide a pause period at each of said station areas, said indexing means further being operable electrically to energize said test probes in synchronism with the recited intermittent transfer of said supporting means, and to effect the recited reciprocable movement of said test probe devices during each of the pause and transfer periods of operation of said supporting means.

2. In apparatus for the automatic testing of electrical component means comprising a housing having lead wires extending therefrom, the combination of: frame means; means defining a chain of socket members for carrying said component means, said chain of socket members comprising a plurality of vertically extending apertured plates each including end portions; means carried by said frame means and defining a path for the sequential transfer of said chain of socket members, said means comprising an endless track having lower and upper parallel guide tracks disposed and adapted to receive said end portions for sliding movements therein; a plurality of reciprocably movable test probe devices each comprising a resiliently mounted set of test probes adapted for engagement with lateral portions of the lead wires of components carried by said socket members as they are transferred along said path, said test probe devices being disposed adjacent said path in position such that reciprocable movement takes place transversely of said path, said test probe devices further being disposed to one side of said plates and said socket members being disposed to the other side thereof, said sets of test probes being extensible and retractible through the apertures in said plates; means defining a prime mover; drive means disposed in driven engagement with said prime mover and adapted to cause simultaneous movement of said test probe devices; travelling means driven by said prime mover for driving said chain of test socket members along said path; and indexing means disposed in driven engagement with said prime mover and adapted to cause intermittent motion of said travelling means, whereby to transfer said socket members along said path with a pause period at each of a plurality of station areas, said indexing means further being constructed and arranged to energize said sets of test probes in synchronism with the intermittent motion imparted to said travelling means, said test probe devices being movable during the pause and motion periods in the transfer of said socket members.

3. Apparatus according to claim 2 and characterized in that said guide tracks comprise channel members within which said plate end portions are received for sliding movements.

4. Combination according to claim 2 and further characterized in that each said socket member comprises an apertured insulative base portion affixed to one of said plates and a slotted insulative portion hingedly attached to a lower portion of said base portion and adapted when hingedly opened to receive a component means with its lead wires disposed in said slots, and when hingedly closed to present received lead wires for engagement by said test probes as they are projected through apertures in said plates.

5. In apparatus for the automatic testing of electrical component means comprising a housing having lead wires extending therefrom, the combination of: a plurality of supporting means for said component means; means defining a path along which said supporting means may be sequentially transferred; a plurality of test probe devices each reciprocably movable and comprising resiliently mounted sets of probes adapted for engagement with the lead wires of components carried by said supporting means as they are transferred along said path, said test probe devices being so disposed along said path that reciprocable movement takes places transversely of said path; chain means interconnecting said supporting means and including a plurality of vertically extending apertured plates, each said plate including end portions disposed and adapted for sliding movements on said means defining a path, said test probe devices being disposed to one side of said plates and said supporting means being disposed to the other side thereof, said sets of test probes being extensible and retractable through apertures in said plates; prime moving means coupled to cause the recited movements of said test probe devices and of said chain means along said path; and indexing means disposed in driven engagement with said prime moving means and adapted to cause intermittent motion of said chain means, and consequently said supporting means, whereby to transfer said supporting means along said path with a pause period at each of a plurality of station areas, said indexing means further being constructed and arranged to energize said test probes in synchronism with said intermittent motion, said test probe devices being movable during the pause and motion periods in the transfer of said supporting means.

6. The combination according to claim 5 and further characterized in that each supporting means comprises an apertured insulative base portion affixed to one of said plates and a slotted insulative portion hingedly attached to a lower portion of said base portion and constructed, when hingedly closed, to present lead wires for engagement by said test probes as they are projected through apertures in said plates and said insulative base portion.

7. In apparatus for the automatic testing of electrical component means including a housing having lead wires extending therefrom, the combination comprising: socket means for holding said component means for testing; a testing zone; conveyor means operable sequentially to transfer said socket means through said testing zone; test probe means disposed and adapted intermittently to engage lateral portions of the lead wires of a component means as it is moved through said testing zone; and extractor means for removing a component means from said socket means upon testing of the same, said extractor means including a bifurcated track disposed and adapted for positioning astride a tested component upon its being tested, said extractor means thereafter being movable substantially vertically to remove said component means from said socket means and to present the component means for sliding movement along the extractor means.

8. In apparatus for the automatic testing of electrical component means comprising a housing having lead wires extending therefrom, the combination of: a plurality of supporting means for said component means; means defining a path along which said supporting means may be sequentially and unidirectionally transferred; a plurality of test probe devices each reciprocably movable and comprising a resiliently mounted set of test probes adapted for engagement with the lead wires of components carried by said supporting means as they are transferred along said path, said test probe devices being so disposed along said path that reciprocable movement takes place transversely of said path, each test probe of said set comprising an electrically conductive flexible and resilient rodlike member having a cylindrical base portion, said devices each comprising a plurality of cylindrical base means telescopingly receiving and supporting said cylindrical base portion of said rod-like member, and coil spring means disposed within said cylindrical base means and reacting between the latter and said cylindrical base portion, said devices further comprising flexible and resilient strap means engaging each of said conductive rodlike members to urge the same in the direction of urging by said coil spring means, said strap means comprising the electrical terminals of said test probes; prime moving means coupled to cause reciprocable movement of said test probe devices and transfer of said supporting means along said path; and indexing means disposed in driven engagement with said prime moving means and adapted to cause intermittent motion of said supporting means, whereby to transfer said supporting means along said path with a pause period at each of a plurality of station areas, said indexing means further being constructed and arranged to energize said test probes in synchronism with the said intermittent motion, said test probe devices being movable during the pause and motion periods in the transfer of said supporting means.

9. In apparatus for the automatic testing of electrical component means comprising a housing having lead wires extending therefrom, the combination of: socket members for said component means; frame means defining a path for the sequential transfer of said socket members;

a plurality of reciprocably movable test probe devices each comprising a resiliently mounted set of test probes adapted for lateral engagement with the lead wires of the components carried by said socket members as they are transferred along said path, said test probe devices being so disposed adjacent said path that reciprocable movement takes place transversely of said path and said lead wires; each test probe of said sets comprising an electrically conductive, flexible and resilient rod-like member having a cylindrical base portion, and said test probe devices each comprising a plurality of cylindrical base means telescopingly receiving and supporting said base portions of said probes, coil spring means within each said base means and reacting between the latter and said base poritons, each said test probe device further comprising flexible and resilient strap means engaging each said conductive rod-like member to urge the same in the direction of urging by said coil springs, said strap means comprising the electrical terminals of said test probe devices; prime moving means coupled to cause movements of said test probe devices; travelling means driven by said prime moving means for driving said test socket members along said path; and indexing means disposed and adapted to cause intermittent motion of said socket members along said path with a pause period at each of a plurality of station areas, said indexing means further being constructed and arranged to energize said test probes in synchronism with the intermittent motion applied to said travelling means, said test probe devices being movable during the pause and motion period in the transfer of said socket members.

10. In apparatus for the automatic testing of electrical component means comprising a housing having lead wires extending therefrom, the combination of: socket members for said component means; frame means defining a path for the sequential transfer of said socket members; a plurality of reciprocably movable test probe devices each comprising a resiliently mounted set of test probes adapted for lateral engagement with the lead wires of components carried by said socket members as they are transferred along said path, said test probe devices being so disposed adjacent said path that reciprocable movement takes place transversely of said path and said lead wires, each said test probe device further comprising a base portion and means resiliently supporting said base portion for limited lateral movements thereof transversely of the direction of movements of said test probe devices, and comprising a channel member upon which is mounted said means resiliently supporting said base member, said channel member being slidably mounted in regions of opposite end portions thereof to provide the recited reciprocable movement of said test probe devices; prime moving means coupled to cause reciprocable movements of said channel member, and consequently said test probe devices; travelling means driven by said prime moving means for driving said test socket members along said path; and indexing means disposed and adapted to cause intermittent motion of said socket members along said path with a pause period at each of a plurality of station areas, said indexing means further being constructed and arranged to energize said sets of test probes in synchronism with the intermittent motion applied to said travelling means, said test probe devices being movable during the pause and motion periods in the transfer of said socket members.

11. In apparatus for the automatic testing of electrical component means including a housing having lead wires extending therefrom, the combination comprising: insulative base means for holding said component means for testing, said base means comprising a hingedly mounted rectangular socket member pivotally movable about a lower portion thereof to and from a generally vertical position; spring means pivotally urging said hinged socket member away from such vertical position; latch means disposed and adapted to engage and maintain said socket member in its recited substantially vertical position wherein lead wires of a component means are presented for testing; means defining a prime mover; means operable by said prime mover selectively to actuate said latch means to release said socket member and to permit it to be pivoted away from its recited vertical position; frame means defining a path for the sequential transfer of said component holding means; reciprocably movable test probe means comprising resiliently mounted conductive members adapted for engagement with lateral portions of said lead wires of components held within said socket members as they are transferred along said path in their recited vertical positions, each said test probe device being so disposed adjacent said path that reciprocable movement of said conductive members is in a direction transverse said path and the direction of extension of said socket members; linkage means disposed in driven relationship with said prime mover and adapted simultaneously to move said test probe devices; indexing means driven with said prime mover and adapted intermittently to move said component means along said path with a pause period at each of a plurality of test areas, said indexing means being so constructed and arranged as to energize said conductive members in synchronism with the pause periods, said test probe devices being movable between and during portions of the pause periods; and means operable by said prime mover, during each such pause period, to be conditioned for extracting a component means from an insulative base means in accordance with the results of a test carried out at a preceding station.

12. Apparatus in accordance with claim 11 wherein said socket member comprises a plurality of grooves extending longitudinally thereof within which said lead wires are received, said grooves being presented toward said test probe means when said socket member is in latched position, whereby to present said lead wires for engagement by said conductive members of said test probe means.

13. Apparatus according to claim 11 and characterized in that said component means and its lead wires are so disposed as to be substantially vertically removable from said socket member in the direction of extension of said lead wires, as said member pivots from said latched position, and component means extractor means operable by said prime mover is so disposed and adapted as to engage a tested component means to remove the same from said released socket member, for disposition thereof according to a test result.

14. Apparatus according to claim 11, and characterized in that said latch means comprises: a combined slidably and pivotally movable rod extending in spaced substantially parallel relationship to said hingedly mounted socket member, and having at its upper end a latch keeper member extending transversely thereof; a latch strike member carried by said socket member and presented for releasable latching engagement with said latch keeper member, said rod like member being vertically movable to release said latch strike member, and pivotally movable to latchingly engage said latch strike member as said socket member is pivoted to its substantially vertical position.

15. In apparatus for the automatic testing of electrical component means comprising a housing having lead wires extending therefrom, the combination comprising: frame means defining a path along which a plurality of component means may be moved; a component means support comprising a grooved insulative base member pivotal between a component means test position and a component means extract position, said lead wires being laterally receivable in grooves of said base member for testing of said component means and axially movable along the grooves in the extraction thereof; means for moving said component support means in simultaneous step-by-step manner along said path; test probe means reciprocably movable into and out of engagement with lateral portions of said lead wires of said component means while it is supported in its test position, between periods of movements of said component means; and means for extracting said component means while it is supported in its extract position and at locations along said path as determined by test results, extraction of a component means being effected at the test station adjacent and following the station at which extraction is determined.

References Cited by the Examiner

UNITED STATES PATENTS

| | | | |
|---|---|---|---|
| 2,567,741 | 9/1951 | Smith | 209—81 |
| 3,039,604 | 6/1962 | Bickel | 209—81 X |
| 3,094,212 | 6/1963 | Moore | 209—81 X |

FOREIGN PATENTS 632,624  12/1961  Canada.

ROBERT B. REEVES, *Primary Examiner.*